United States Patent
Tuch et al.

(10) Patent No.: US 8,738,868 B2
(45) Date of Patent: May 27, 2014

(54) COOPERATIVE MEMORY RESOURCE MANAGEMENT FOR VIRTUALIZED COMPUTING DEVICES

(75) Inventors: Harvey Tuch, Cambridge, MA (US); Craig Newell, Cambridge, MA (US); Cyprien Laplace, Grenoble (FR)

(73) Assignee: VMware, Inc., Palo Alto, CA (US)

( * ) Notice: Subject to any disclaimer, the term of this patent is extended or adjusted under 35 U.S.C. 154(b) by 422 days.

(21) Appl. No.: 13/215,948

(22) Filed: Aug. 23, 2011

(65) Prior Publication Data
US 2013/0054922 A1 Feb. 28, 2013

(51) Int. Cl.
G06F 12/00 (2006.01)
G06F 13/00 (2006.01)
G06F 13/28 (2006.01)
G06F 12/08 (2006.01)
G06F 9/50 (2006.01)

(52) U.S. Cl.
CPC ............ *G06F 12/08* (2013.01); *G06F 2212/00* (2013.01); *G06F 9/5016* (2013.01); *G06F 9/5077* (2013.01)
USPC ............................ 711/158; 711/129; 711/130

(58) Field of Classification Search
CPC ............ G06F 12/0284; G06F 22/2212; G06F 9/5016; G06F 9/5077
USPC .......................................... 711/153, 129–130
See application file for complete search history.

(56) References Cited

U.S. PATENT DOCUMENTS

| | | | |
|---|---|---|---|
| 7,433,951 | B1 | 10/2008 | Waldspurger |
| 2004/0221285 | A1 | 11/2004 | Donovan et al. |
| 2008/0126738 | A1 | 5/2008 | Hepkin et al. |
| 2008/0320203 | A1* | 12/2008 | Fitzgerald ..................... 711/5 |
| 2010/0169536 | A1 | 7/2010 | Shedel et al. |
| 2010/0191929 | A1* | 7/2010 | Rawson, III ................. 711/170 |
| 2011/0138147 | A1* | 6/2011 | Knowles et al. ............. 711/170 |
| 2011/0283071 | A1* | 11/2011 | Yokoya et al. ............... 711/162 |
| 2012/0324481 | A1 | 12/2012 | Xia et al. |

OTHER PUBLICATIONS

Barr, Ken et al., "The VMware Virtualization Platform: is that a hypervisor in your pocket?", ACM SIGOPS Operating Systems Review, vol. 44, Issue 4, pp. 124-135, Dec. 13, 2010.
Waldspurger, Carl A., "Memory Resource Management in VMware ESX Server", Proceedings of the 5th Symposium on Operating Systems Design and Implementation, pp. 181-194, 2002.
Tuch, Harvey et al., U.S. Appl. No. 12/966,766, "Virtualizing Processor Memory Protection with "L1 Iterate and L2 Drop/Repopulate"", 49 pages, filed Dec. 13, 2010.

* cited by examiner

*Primary Examiner* — Ryan Bertram

(57) ABSTRACT

A computing device employs a cooperative memory management technique to dynamically balance memory resources between host and guest systems running therein. According to this cooperative memory management technique, memory that is allocated to the guest system is dynamically adjusted up and down according to a fairness policy that takes into account various factors including the relative amount of readily freeable memory resources in the host and guest systems and the relative amount of memory allocated to hidden applications in the host and guest systems.

22 Claims, 5 Drawing Sheets

COOPERATIVE MEMORY RESOURCE MANAGEMENT FOR VIRTUALIZED COMPUTING DEVICES

BACKGROUND

Over the past decade, enterprises have experienced a substantial increase in the productivity of its workforce when providing them with business mobile devices. In the past, given their high cost, business mobile devices were mainly allocated to management and focused on providing employees with email access and cellular phone capabilities. However, recent improvements in the computing power, mobile display technologies and connection speeds of mobile devices, combined with the continued decreases in hardware costs, have made powerful mobile devices available even to the general public for personal use. More and more individuals personally own powerful mobile devices, such as smartphones, that, in addition to serving as a cellular phone, can be used in many of the same ways as a desktop or a laptop, such as accessing emails, browsing documents or the internet, game playing, listening to audio or viewing a video, and personal information management (PIM).

Due to the above trends in mobile devices, enterprises are currently experiencing an "invasion" of personal devices into the workplace. Given the sophisticated capabilities of their personal mobile devices, employees no longer desire possessing a separate personal and business mobile device and continually pressure information technology (IT) departments to support personal devices brought into the workplace. As such, IT departments struggle to maintain a proper balance between enabling a certain level of access to enterprise data (e.g., such as access to email, contacts, documents, and the like) on personal devices and ensuring adequate security measures to protect corporate intellectual property in such enterprise data. This phenomenon has led enterprises to investigate the viability of a "Bring Your Own Device" (BYOD) strategy to IT, where a personal mobile device is provisioned by IT departments with the capability of operating as a complete business mobile device in a secure fashion.

Virtualization has been proposed as a solution for consolidating personal and business uses in a single mobile device. With virtualization, personal and work environments remain isolated. As a result, the user need not provide enterprise IT departments any control of the user's personal environment and the enterprise IT departments can retain strict control of the user's work environment. Another important feature of virtualization is that the user's work environment will be platform independent. Regardless of the type of personal mobile device the user chooses, the resulting work mobile device through virtualization will be identical. Therefore, enterprise IT departments need to support only one type of work mobile device.

When a mobile device is provisioned in the manner described above for both personal and work uses, it is not uncommon for the mobile device to encounter memory shortages. For example, the mobile device may have 400 MB of memory and the browser (which may be run in the personal environment on top of an operating system that is consuming about 25 MB of memory or the work environment on top of an operating system that is consuming about 25 MB of memory) may require around 250 MB of memory. Therefore, it would not be possible to partition memory statically to support the browser in both environments. Instead, memory resources will have to be dynamically assigned between the two environments. In addition, mobile device operating systems such as Android®, which support multitasking of applications, divide up memory resources between applications, prioritizing based on user visibility and recency of use. This adds a layer of complexity to any memory management schemes and makes it challenging to ensure that memory resources are divided fairly between the personal and work environments. It should further be noted that memory models of certain operating systems, such as Android®, does not rely entirely on swap but also employs asynchronous process termination. As a result, memory management schemes designed for such operating systems will have to ensure that the important processes are not being terminated prematurely in one environment because of memory pressure in the other environment.

SUMMARY

One or more embodiments of the invention provide a cooperative memory management technique for a computing device having host and guest systems that share memory resources. In this cooperative memory management technique, memory that is allocated to the guest system is dynamically adjusted up and down according to a fairness policy that takes into account various factors including the relative amount of readily freeable memory resources in the host and guest systems and the relative amount of memory allocated to hidden applications in the host and guest systems.

A method of managing memory in a computing device having host and guest systems, according to an embodiment of the invention, includes determining a first difference that is based on a memory availability value in the host system and a memory availability value in the guest system, determining a second difference that is based on an amount of memory allocated to hidden applications running in the host system and an amount of memory allocated to hidden applications running in the guest system, and allocating memory to a process running in the guest system in accordance with a target value that is a function of the first and second differences. The process running in the guest system, in one embodiment, is a kernel driver. Memory that is allocated to this kernel driver according to the target value is pinned and relinquished to the host system for reallocation.

Another embodiment of the invention include a non-transitory computer-readable storage medium storing instructions that when executed by a computer system cause the computer system to perform the method set forth above.

A computing device according to an embodiment of the invention includes a processor in which host and guest systems are executed, and memory that is shared between the host and guest systems, wherein the host system determines a memory allocation adjustment value for the guest system as a function of a first difference that is based on a memory availability value in the host system and a memory availability value in the guest system, and a second difference that is based on an amount of memory allocated to hidden applications running in the host system and an amount of memory allocated to hidden applications running in the guest system.

DETAILED DESCRIPTION

Figure 1:
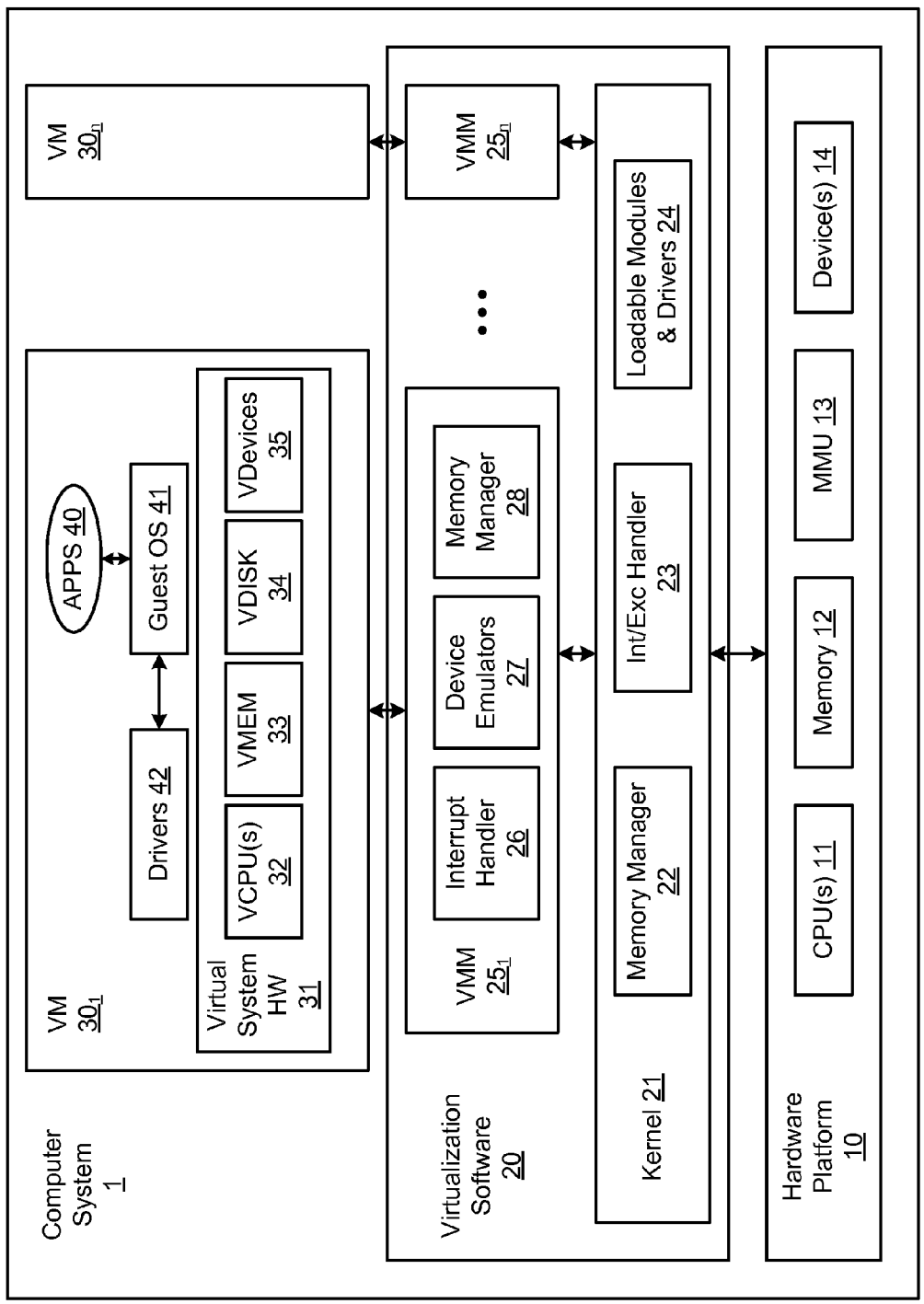
FIG. 1 shows a virtualized computer system with which one or more embodiments of the present invention may be utilized.

FIG. 1 shows a virtualized computer system with which one or more embodiments of the present invention may be utilized. In particular, FIG. 1 illustrates an embodiment of a general configuration of kernel-based, virtual computer system 1 that includes one or more virtual machines (VMs), VM $30_1$-VM $30_n$, each of which is installed as a "guest" on "host" hardware platform 10. As further shown in FIG. 1, hardware platform 10 includes one or more central processing units (CPU(s)) 11, e.g., ARM processors, memory 12, memory management unit (MMU) 13, and various other conventional devices 14.

As further shown in FIG. 1, VM $30_1$ includes virtual system hardware 31 which includes one or more virtual central processing units (VCPU(s)) 32, virtual system memory 33, virtual disk 34, and various virtual devices 35. VM $30_1$ also includes guest operating system (OS) 41 running on virtual system hardware 31, along with a set of drivers 42 for accessing virtual devices 35. One or more software applications (apps) 40 may execute in VM $30_1$ on guest OS 41 and virtual system hardware 31. All of the components of VM $30_1$ may be implemented in software using known techniques to emulate the corresponding components of an actual computer.

As further shown in FIG. 1, VMs $30_1$-$30_n$ are supported by virtualization software 20 comprising kernel 21 and a set of virtual machine monitors (VMMs), including VMM $25_1$-VMM $25_n$. In this implementation, each VMM supports one VM. Thus, VMM $25_1$ supports VM $30_1$, and VMM $25_n$ supports VM $30_n$. As further shown in FIG. 1, VMM $25_1$ includes, among other components, device emulators 27, which may constitute virtual devices 35 accessed by VM $30_1$. VMM $25_1$ also includes memory manager 28, the general operation of which is described below. VMM $25_1$ also usually tracks, and either forwards (to some form of system software) or itself schedules and handles, all requests by VM $30_1$ for machine resources, as well as various faults and interrupts. A mechanism known in the art as an exception or interrupt handler 26 may therefore be included in VMM $25_1$. VMM $25_1$ will handle some interrupts and exceptions completely on its own. For other interrupts/exceptions, it may be either necessary or at least more efficient for VMM $25_1$ to call kernel 21 to have kernel 21 handle the interrupts/exceptions itself. VMM $25_1$ may forward still other interrupts to VM $30_1$.

Kernel 21 handles the various VMM/VMs and includes interrupt/exception handler 23 that is able to intercept and handle interrupts and exceptions for all devices on the machine. Kernel 21 also includes memory manager 22 that manages all machine memory. When kernel 21 is loaded, information about the maximum amount of memory available on the machine is available to kernel 21; part of machine memory 12 is used for kernel 21 itself, some are used to store code, data, stacks and so forth, and some are used for guest memory of virtual machines. In addition, memory manager 22 may include algorithms for dynamically allocating memory among the different VMs.

In some embodiments, kernel 21 is responsible for providing access to all devices on the physical machine, and kernel 21 will typically load conventional drivers as needed to control access to devices. Accordingly, FIG. 1 shows loadable modules and drivers 24 containing loadable kernel modules and drivers. Kernel 21 may interface with loadable modules and drivers 24 using an API or similar interface.

Figures 2A, 2B:
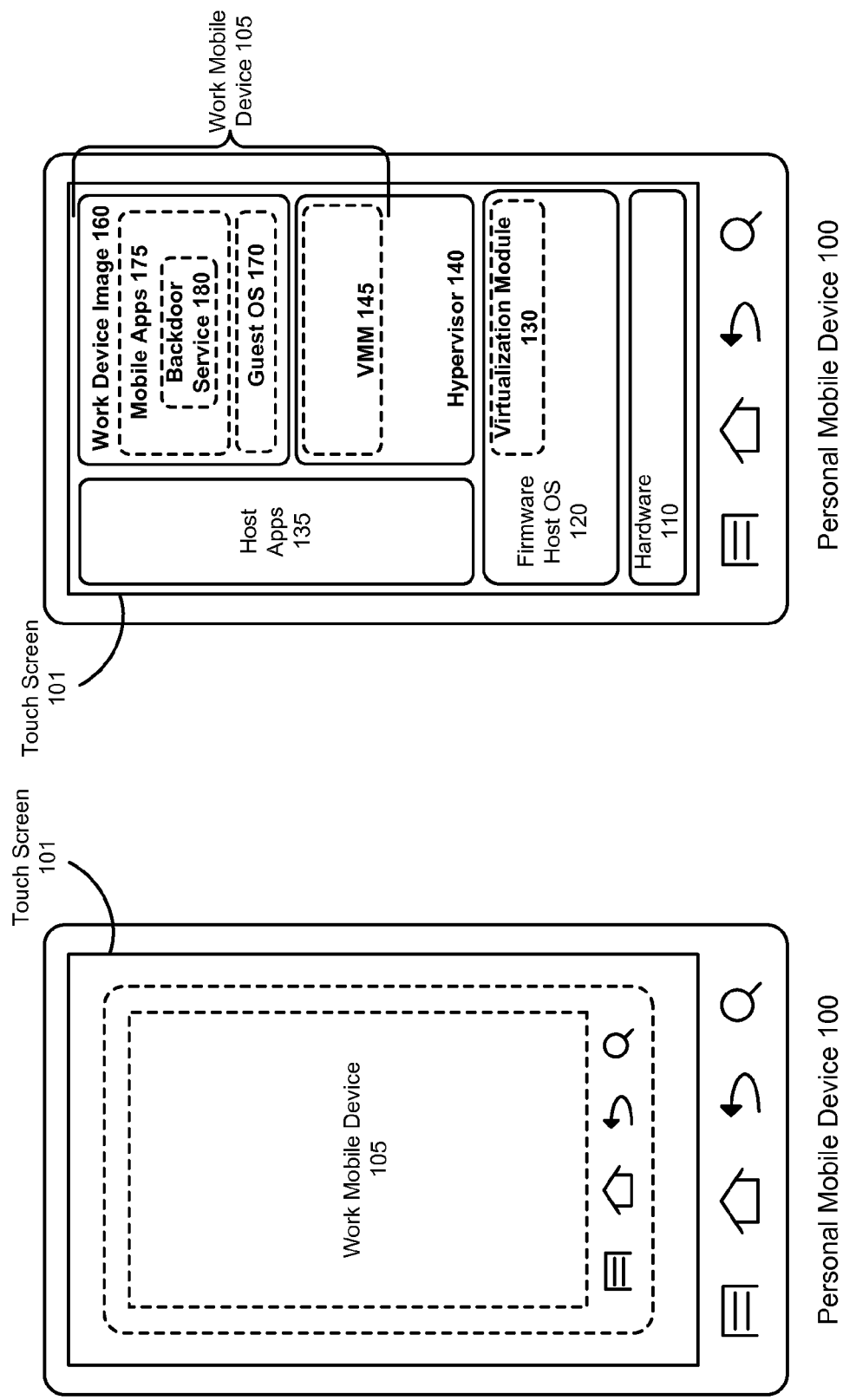
FIG. 2A is a schematic illustration of a mobile computing device according to one or more embodiments of the invention.
FIG. 2B illustrates components of the mobile computing device of FIG. 1A that enable the mobile computing device to be used as a personal mobile device and a work mobile device.

FIG. 2A is a schematic illustration of a mobile device according to one or more embodiments of the invention. The mobile device shown in FIG. 2A is a personal mobile device 100 having a touch screen 101. Personal mobile device 100 may be smartphone, a tablet computing device, and in general any computing device that is portable and configured for wireless connectivity with a network. Personal mobile device 100, conceptually, provides access to a completely separate work mobile device 105 that is generally isolated and operates separately from personal mobile device 100 (illustrated in dashed lines to indicate the work mobile device 105 is running as a software component inside personal mobile device 100). As further discussed below, in one embodiment, work mobile device 105 operates as a virtual machine running within a virtualization platform that is itself running on top of the operating system of personal mobile device 100. As further detailed in FIG. 2B, personal mobile device 100 comprises hardware 110 such as processor and memory, firmware that includes host operating system (OS) 120, and host applications 135 running on top of host OS 120, e.g., the Android® operating system provided by Google, Inc.

As depicted in FIG. 2B, work mobile device 105 operates as a virtual machine running on hypervisor 140 and, conceptually, includes a virtual machine monitor (VMM) 145 and accesses a "virtual disk," which is shown as work device image 160. VMM 145 may be considered a component of hypervisor 140 (which itself runs as a high priority user-level application on host OS 120) that emulates hardware resources for work mobile device 105. Work device image 160 includes a guest OS 170, which may be any commodity operating system such as the Android® operating system and applications 175 running on top of guest OS 170. In the embodiment of FIG. 2B, applications 175 includes a backdoor service application 180 that establishes a direct communication channel to hypervisor 140 (which itself runs on top of host OS 140). Backdoor service application 180 is a "backdoor" application because typical applications running on top of guest OS 170 are not aware that they are running in a virtual machine. However, backdoor service application 180 is aware that it is running in a virtual machine on top of hypervisor 140 and can therefore request or provide special data and services to and from hypervisor 140, for example, when certain user interface enhancement as further described below between personal mobile device 100 and work mobile device 105 are desirable. In one embodiment, backdoor service 180 establishes the direct communication channel with hypervisor 140 by connecting to a unique network port that hypervisor 140 has opened and is listening on, although it should be recognized that alternative embodiment can establish such a communication channel utilizing different techniques. As will be further discussed, the direct communication channel between backdoor service 180 and hypervisor 140 facilitates remote procedure calls (RPC) between components existing in personal mobile device 100 and work mobile device 105.

Figure 3:
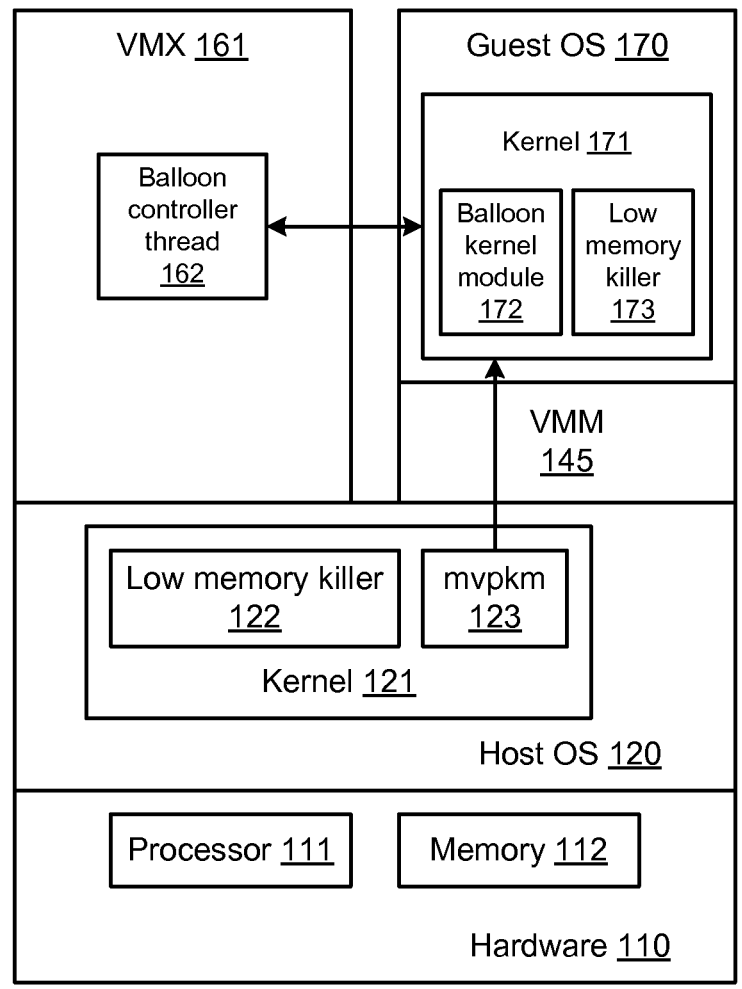
FIG. 3 illustrates components of the mobile computing device of FIG. 2A that implement a cooperative memory management technique according to one or more embodiments of the invention.

FIG. 3 illustrates components of the mobile computing device of FIG. 2A that implement a cooperative memory management technique according to one or more embodiments of the invention. These components include a kernel 121 of host OS 120, VMM 145 that emulates hardware resources, such as processor 111 and memory 112, for work mobile device 105, a kernel 171 of guest OS 170, a balloon kernel module 172 running as a module inside kernel 171, and a balloon controller thread 162 running as a module inside VMX 161. VMX 161 is one of host applications 135 and runs as a high-priority background process to coordinate context changes between the execution of VMM 145 (i.e., the guest), and the execution of host OS 120 (i.e., the host). The cooperative memory management technique disclosed herein, however, is applicable to other configurations. For example, the host may be running an environment that is accessible to many users, and the guest may be running an environment that is accessible to a particular user. Furthermore, it should be recognized that host OS 120 and guest OS 170 may implement the same or different commercially available operating systems.

Kernel 121 manages memory 112, also referred to herein as machine memory, allocating free memory on demand for use in its caches (e.g., page cache, slabs) and for applications and kernel modules (e.g., drivers). When available free memory is low, e.g., less than a certain threshold, an event known as a slab shrink event occurs. In response to the slab shrink event and other low memory signalling mechanisms, kernel 121 frees up memory from its caches. If there is insufficient memory in the kernel caches, one or more "hidden" applications, which are user-level applications that are no longer visible to the user, may be terminated by a kernel module, known as low memory killer 122. The termination of the hidden applications is carried out in the order of their priority values (low priority ones being terminated prior to the high priority ones), as assigned by kernel 121.

Guest OS 170 supports user-level applications that are executed in the work mobile device 105 and has a kernel 171 that manages guest physical memory (e.g., memory 112 as emulated by VMM 145) in the same manner kernel 121 manages machine memory. Thus, in response to slab shrink events occurring inside the guest, kernel 171 frees up memory from its caches. If there is insufficient memory in the kernel caches, one or more hidden applications running in the work mobile device 105 may be terminated by low memory killer 173 of kernel 171 in the order of their priority values (low priority ones being terminated prior to the high priority ones), as assigned by kernel 171.

In the memory management techniques described above, each of kernels, kernel 121 and kernel 171, allocate and deallocate memory without knowledge of what the other kernel is doing. For cooperative memory management between the two, a memory management technique known as memory ballooning is employed. According to this technique, kernel 171 implements memory ballooning by allocating guest physical memory pages to balloon kernel module 172 and pinning the allocated memory pages so that the machine pages corresponding to the pinned guest physical memory pages can be reallocated by the host. When memory ballooning is operated in reverse, the pinned guest physical memory pages are unpinned so that they become available to be allocated to guest applications and to other modules of kernel 171.

Memory ballooning is initiated when kernel 171 polls a controlling thread, shown in FIG. 3 as balloon controller thread 162, for a balloon adjustment value. In one embodiment, the polling is done using RPC, and includes information on the memory state of the guest, such as the number of memory pages in the guest's free memory pool and the guest's page cache, and the number of memory pages allocated to background processes running in the guest. In response, balloon controller thread 162 calculates the balloon adjustment value in compliance with a fairness policy which will be described in detail below and returns the balloon adjustment value to kernel 171. Based on this balloon adjustment value, kernel 171 determines whether memory ballooning should be implemented in the forward direction (also known as "inflating" the balloon) or in the reverse direction (also known as "deflating" the balloon). When the balloon adjustment value is greater than zero, kernel 171 inflates the balloon by allocating additional guest physical memory pages to balloon kernel module 172 and pinning them. On the other hand, when the balloon adjustment value is less than zero, kernel 171 deflates the balloon by unpinning some of the guest physical memory pages allocated to balloon kernel module 172 that were previously pinned.

According to one or more embodiments of the present invention, kernel 171 may poll balloon controller thread 162 for a balloon adjustment value to initiate memory ballooning in response to a slab shrink event occurring in the host, which is communicated to kernel 171 through VMM 145, or a slab shrink event occurring in the guest. Kernel 171 may also poll balloon controller thread 162 for the balloon adjustment value on a periodic basis when slab shrink events are not occurring either in the guest or the host so that memory allocation between the host and the guest can be kept balanced in compliance with the fairness policy. However, the periodic polling is carried out when the guest is awake and not when the guest is asleep so as to conserve battery power.

When the balloon adjustment value is greater than zero, a process in kernel 171 first attempts to allocate guest memory pages without sleeping (e.g., by using the function GFP_ALLOC_NO_SLEEP). This can be done by allocating guest memory pages from its free memory pool. If the amount of memory pages in the free memory pool is not sufficient, however, the process is permitted to sleep (e.g., by using the function GFP_ALLOC_CANSLEEP) to give kernel 171 some time to free up guest memory pages, e.g., by writing out dirty pages in its page cache to disk or by allowing its low memory killer to terminate one or more processes. If the amount of memory pages that can be allocated is still not sufficient, kernel 171 schedules a deferred poll with a set time, e.g., 1 second. If the balloon inflation is successful, the periodic polling described above is scheduled with a variable delay. The purpose of the periodic polling is to determine whether or not further balloon adjustment is required. The delay is calculated such that it is inversely proportional to the rate of change of the balloon adjustment value. If the balloon adjustment value is rapidly increasing or decreasing, the delay is set to a small value, e.g., 200 msec. On the other hand, if only a small net change in the balloon adjustment value has taken place recently, the delay is set to a large value, e.g., 1 second.

When the balloon adjustment value is less than zero, kernel 171 responds by unpinning some of the guest physical memory pages allocated to balloon kernel module 172 that were previously pinned. When the balloon adjustment value is equal to zero, kernel 171 does nothing.

One goal of the fairness policy is to avoid having the low memory killers in the host and the guest from terminating any services and applications currently visible to the user, while there remains freeable memory or hidden applications globally. This goal is achieved by setting the balloon adjustment value to ensure that freeable memory is moved between the host and the guest, taking memory from the side that is rich in freeable memory and giving it to the other side. The fairness policy also gives weight (in the form of a bias) to the amount of memory allocated to hidden applications in the host and the guest, such that the side under memory pressure with a large amount of memory allocated to hidden applications should yield memory to the other side under the same pressure with a smaller amount of memory allocated to hidden applications. This bias is gradually reduced as the number of hidden applications in a system, the host or the guest as the case may be, is reduced, so as to avoid a situation where the system is pushed into an extreme low memory state with only a small amount of applications to terminate.

In one embodiment, the balloon adjustment value, Δ, is computed as a fraction of an error value, E, that has two components, Elowmem and Ebg. Elowmem is indicative of the imbalance in the freeable memory between the host and the guest, and Ebg is the hidden application memory bias. The balloon adjustment value is taken as a fraction (a value between 0 and 1, e.g., 0.5), Kp, so that the imbalance is gradually (conservatively) corrected. The governing equations is as follows:

$$\Delta = Kp * E$$

Elowmem is the difference between low memory distances in the host and the guest, where the low memory distance provides a measure of the number of pages in the free memory pool (represented as FREE) and page cache (represented as FILE) that may be consumed by normal memory allocation until max(FREE, FILE)<Kempty, where Kempty is the threshold number of pages at which the low memory killer will begin terminating processes. The following is one particular implementation of the above logic:

$$Elowmem = \text{Low}Mem\text{Distance of guest} - \text{Low}Mem\text{Distance of host, where:}$$

$$\text{Low}Mem\text{Distance} = (FREE + FILE - K\text{empty}), \text{ if } FILE \geq K\text{empty; and}$$

$$\text{Low}Mem\text{Distance} = \max(0, FREE - K\text{empty}), \text{ if } FILE < K\text{empty.}$$

Ebg is calculated from the number of resident set size (RSS) pages belonging to hidden applications in the host (represented as RSS_H) and the number of RSS pages belonging to hidden applications in the guest (represented as RSS_G), based on the following equation:

$$Ebg = S * (RSS\_G - RSS\_H)/(RSS\_G + RSS\_H)$$

The multiplier, S, provides the magnitude of the bias, and the adjacent fraction (which has a value from −1 to +1) provides the direction and proportion. The multiplier, S, is set to be less than max(RSS_G, RSS_H), since the low memory killer will begin to terminate non-hidden applications as well as hidden applications if confronted with too large a bias. Therefore, the size of the multiplier, S, is limited by the following equation:

$$S = \min(K r \max, K r s s * \max(RSS\_G, RSS\_H))$$

Krmax represents a bound on the size of the bias and is used when there are a large number of hidden application pages. It should be large enough to ensure balloon adjustment will force necessary hidden application memory killing in the world (host or guest) with the higher number of hidden application pages, but not much larger, since it affects the maximum amount of memory available in the system for hidden application pages when an imbalance exists between hidden application pages in the guest and host. Krss is a fudge factor to account for the fact that the RSS measure does not accurately reflect the actual number of pages hidden applications use. It should be understood that RSS overestimates as it includes pages used by shared libraries. The fudge factor, Krss, is determined empirically by looking at how RSS tends to overestimate on some sample applications.

Figure 4:
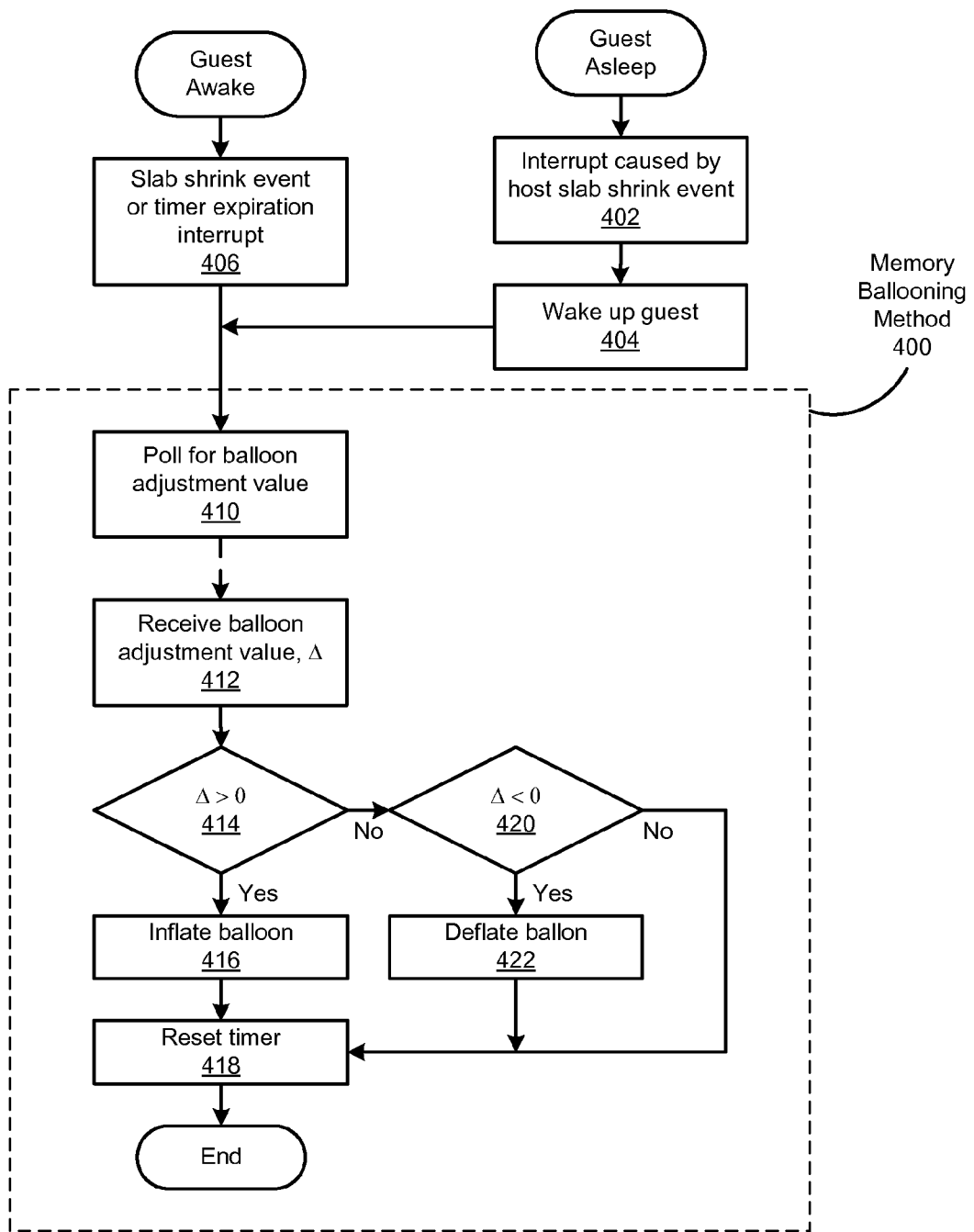
FIG. 4 is a flow diagram that illustrates a memory ballooning method according to an embodiment of the invention.

FIG. 4 is a flow diagram that illustrates a memory ballooning method 400 according to an embodiment of the invention. When the guest is awake, method 400 is carried out in response to (i) a slab shrink event occurring in the host or the guest; or (ii) an interrupt that is issued when a timer that has been set for periodically polling balloon controller thread 162 with a request for an updated balloon adjustment value expires (step 406). If the slab shrink event occurred in the host, the event is forwarded by mvpkm 123 to VMM 145 and VMM 145 passes it onto kernel 171 in the form of an interrupt. If the slab shrink event occurred in the guest, it is directly detected by kernel 171. When the guest is sleeping, the guest waits for an interrupt indicating a slab shrink event occurring in the host (step 402). The guest wakes up in response to the interrupt at step 404 and method 400 is carried out thereafter.

At step 410, kernel 171 polls balloon controller thread 162 via an RPC for a balloon adjustment value. The polling includes the memory state of the guest, such as the number of memory pages in the guest's free memory pool and the guest's page cache, and the number of memory pages allocated to background processes running in the guest. Some time later, as denoted by the dashed arrow, kernel 171 receives the balloon adjustment value from balloon controller thread 162. If the balloon adjustment value is positive as determined at step 414, kernel 171 inflates the balloon at step 416 by allocating additional memory pages to balloon kernel module 172 in proportion to the size of the balloon adjustment value and pinning these newly allocated memory pages. After inflating the balloon, kernel 171 resets the timer at step 418. The timer value may be adjusted such that it is inversely proportional to the rate of change of the balloon adjustment value. If the balloon adjustment value is rapidly increasing or decreasing, the delay is set to a small value, e.g., 200 msec. On the other hand, if only a small net change in the balloon adjustment value has taken place recently, the delay is set to a large value, e.g., 1 second. If the balloon adjustment value is negative as determined at step 420, kernel 171 deflates the balloon at step 422 by unpinning a number of the memory pages allocated to balloon kernel module 172 in proportion to the size of the balloon adjustment value. After step 422, kernel executes step 418 where the timer is reset as described above. If the balloon adjustment value is zero, kernel 171 does nothing and proceeds directly to step 418.

It should be recognized that, in parallel with the memory ballooning technique described above, host kernel and guest kernel are separately managing memory allocations and deallocations in accordance with its own policies. For example, as described above, kernel 121 or kernel 171 frees up memory from its caches when it experiences memory pressure such as a slab shrink event. If there is insufficient memory in the kernel caches, one or more hidden applications may be terminated by the low memory killer.

In some embodiments, kernel 171 limits how often balloon controller module 172 may poll balloon controller thread 162 for updated balloon adjustment values by imposing a minimum delay between successive polls. If the host or the guest is under heavy memory pressure and issuing many slab shrink events, this minimum delay protects against overloading balloon controller thread 162, and ultimately the CPU, with balloon adjustment requests.

Figure 5:
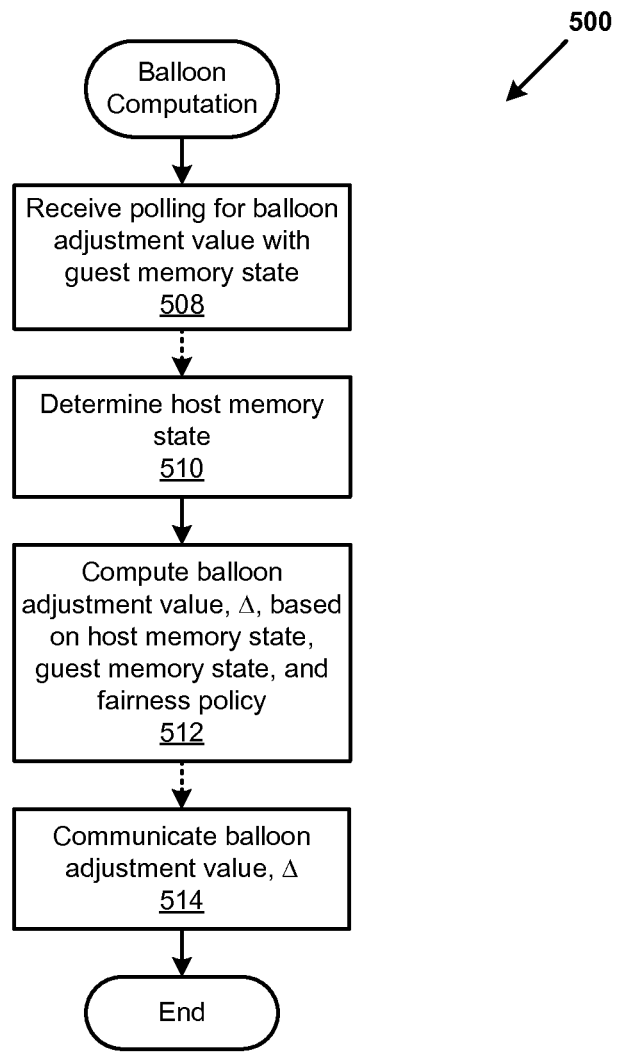
FIG. 5 is a flow diagram that illustrates a method for computing a balloon adjustment value according to an embodiment of the invention.

FIG. 5 is a flow diagram that illustrates a method 500 for computing a balloon adjustment value according to an embodiment of the invention. Method 500 is carried out by balloon controller thread 162 in response to a polling from kernel 171 described above in conjunction with step 310. At step 508, balloon controller thread 162 receives via RPC the polling from kernel 171, which includes the memory state of the guest, such as the number of memory pages in the guest's free memory pool and the guest's page cache, and the number of memory pages allocated to background processes running in the guest. Then, at step 510, balloon controller thread 162 determines using application programming interfaces (APIs) exposed by host OS 120 the memory state of the host, such as the number of memory pages in the host's free memory pool and the host's page cache, and the number of memory pages allocated to background processes running in the host. At step 512, the values obtained at step 508 and 510 are plugged into the equations that implement the fairness policy described above to obtain the balloon target value. Then, at step 514, the balloon target value is communicated to kernel 171 via RPC, after which kernel 171 carries out steps 312 et seq. as described above.

Although one or more embodiments of the present invention have been described in some detail for clarity of understanding, it will be apparent that certain changes and modifications may be made within the scope of the claims. For example, while embodiments herein have referred to certain mobile operating systems such as Android, it should be recognized that any mobile operating systems may be utilized in alternative embodiments such as Apple's iOS, Research in Motion's Blackberry OS, Microsoft's Windows Phone, Hewlett Packard's webOS, Symbian, Java, and the like, and also non-mobile operating systems such as Mac OS X may be utilized in further embodiments. In addition, it should be recognized that the claims are applicable to embodiments employing a bare metal hypervisor as well as embodiments employing multiple guest virtual machines on a bare metal or hosted hypervisor. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Virtualization systems in accordance with the various embodiments, which may be hosted embodiments such as shown in FIGS. 2B and 3, non-hosted embodiments such as shown in FIG. 1, or embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of managing memory in a computing device having host and guest systems that share memory resources, each of the host and guest systems configured to terminate processes upon experiencing memory pressure, comprising:
   determining a first difference that is based on a memory availability value in the host system and a memory availability value in the guest system;
   determining a second difference that is based on an amount of memory allocated to hidden applications running in the host system and an amount of memory allocated to hidden applications running in the guest system; and
   allocating memory to a process running in the guest system in accordance with a target value that is a function of the first and second differences.

2. The method of claim 1, wherein the memory availability value in each of the host and guest systems is based on a number of pages in a free memory pool.

3. The method of claim 2, wherein the memory availability value in each of the host and guest systems is also based on a number of pages in a page cache that is available for on-demand memory allocation, until the number of pages in the page cache that is available for on-demand memory allocation is less than a threshold number of pages at which the corresponding host or guest system begins terminating processes.

4. The method of claim 1, wherein the amount of memory allocated to hidden applications running in each of the host and guest systems is determined as a sum of resident set sizes of the hidden applications running therein.

5. The method of claim 1, wherein the second difference is bound by an upper limit.

6. The method of claim 5, wherein the upper limit is a function of the amount of memory allocated to hidden applications running in the host and guest systems that is larger.

7. The method of claim 1, further comprising:
updating the target value on a periodic basis,
wherein the memory allocated to the process running in the guest system is adjusted in accordance with the updated target value.

8. The method of claim 1, further comprising:
detecting a memory pressure condition in the host system and, in response thereto, updating the target value,
wherein the memory allocated to the process running in the guest system is adjusted in accordance with the updated target value.

9. The method of claim 1, further comprising:
detecting a memory pressure condition in the guest system and, in response thereto, updating the target value on a periodic basis,
wherein the memory allocated to the process running in the guest system is adjusted in accordance with the updated target value.

10. The method of claim 1, wherein the process running in the guest system is a kernel driver.

11. A non-transitory computer-readable storage medium comprising instructions to be executed in a computing device having host and guest systems that share memory resources to cause the host system to carry out the steps of:
determining a first difference that is based on a memory availability value in the host system and a memory availability value in the guest system;
determining a second difference that is based on an amount of memory allocated to hidden applications running in the host system and an amount of memory allocated to hidden applications running in the guest system; and
determining a memory allocation adjustment value for the guest system as a function of the first and second differences.

12. The non-transitory computer-readable storage medium of claim 11, wherein the memory availability value in each of the host and guest systems is based on a number of pages in a free memory pool.

13. The non-transitory computer-readable storage medium of claim 12, wherein the memory availability value in each of the host and guest systems is also based on a number of pages in a page cache that is available for on-demand memory allocation, until the number of pages in the page cache that is available for on-demand memory allocation is less than a threshold number of pages at which the corresponding host or guest system begins terminating processes.

14. The non-transitory computer-readable storage medium of claim 11, wherein the amount of memory allocated to hidden applications running in each of the host and guest systems is determined as a sum of resident set sizes of the hidden applications running therein.

15. The non-transitory computer-readable storage medium of claim 11, wherein the second difference is bound by an upper limit.

16. The non-transitory computer-readable storage medium of claim 15, wherein the upper limit is a function of the amount of memory allocated to hidden applications running in the host and guest systems that is larger.

17. A computing device comprising:
a processor in which host and guest systems are executed, and memory that is shared between the host and guest systems,
wherein the host system determines a memory allocation adjustment value for the guest system as a function of a first difference that is based on a memory availability value in the host system and a memory availability value in the guest system, and a second difference that is based on an amount of memory allocated to hidden applications running in the host system and an amount of memory allocated to hidden applications running in the guest system.

18. The computing device of claim 17, wherein the memory availability value in each of the host and guest systems is based on a number of pages in a free memory pool.

19. The computing device of claim 18, wherein the memory availability value in each of the host and guest systems is also based on a number of pages in a page cache that is available for on-demand memory allocation, until the number of pages in the page cache that is available for on-demand memory allocation is less than a threshold number of pages at which the corresponding host or guest system begins terminating processes.

20. The computing device of claim 17, wherein the amount of memory allocated to hidden applications running in each of the host and guest systems is determined as a sum of resident set sizes of the hidden applications running therein.

21. The computing device of claim 17, wherein the second difference is bound by an upper limit.

22. The computing device of claim 21, wherein the upper limit is a function of the amount of memory allocated to hidden applications running in the host and guest systems that is larger.

* * * * *